May 20, 1969
L. C. McMANUS
3,445,749
COMPOUND WOUND DIRECT CURRENT GENERATOR HAVING
A SPLIT SHUNT FIELD WINDING
Filed Nov. 29, 1966
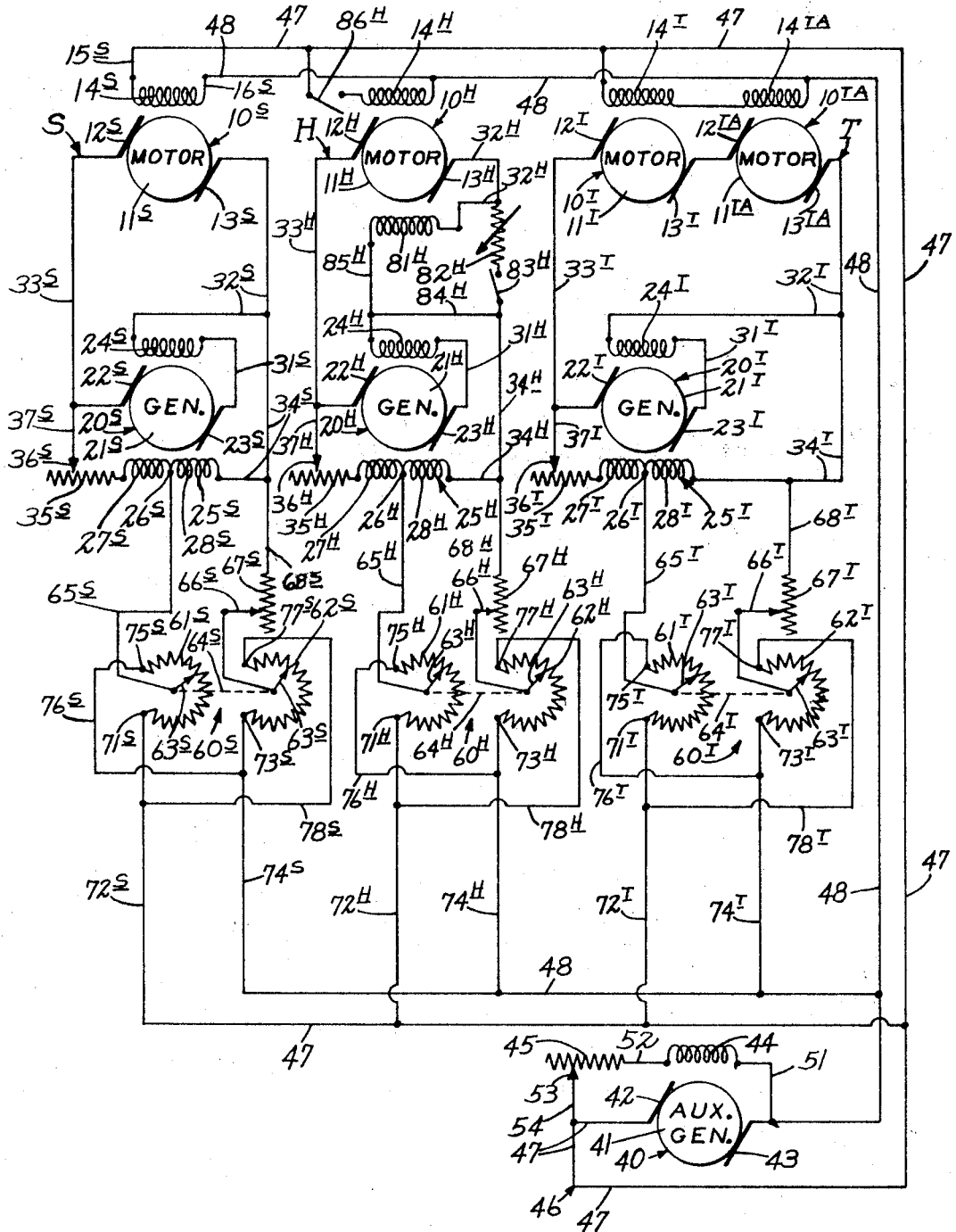
INVENTOR.
LEE C. McMANUS
BY
Caswell, Lagaard & Wicks
ATTORNEYS

United States Patent Office 3,445,749
Patented May 20, 1969

---

3,445,749
COMPOUND WOUND DIRECT CURRENT GENERATOR HAVING A SPLIT SHUNT FIELD WINDING
Lee C. McManus, Duluth, Minn., assignor to Clyde Iron Works, Inc., Duluth, Minn.
Filed Nov. 29, 1966, Ser. No. 597,707
Int. Cl. H02r 9/10, 9/40
U.S. Cl. 322—63        5 Claims The herein disclosed invention relates to compound wound, direct current, electric generators for energizing variable electric loads and, particularly, for energizing the electric motors of a crane.

An object of the invention is to provide a generator in which the maximum output of the generator and also the maximum voltage produced thereby can be regulated for varying load conditions resulting from improper or proper operation of the crane or other installation with which the generator is used.

In carrying out this object, a direct current, compound wound, electric generator is employed, having a series field winding and a split shunt field winding providing two sections connected in series. One of said sections is energized by the generator and the other by a separate source of electric energy producing a voltage across the same greater than the generator voltage. A variable resistor in series with the two sections of the shunt winding serves to reduce the voltage across the shunt winding to a usable value. The series winding is differentially wound with reference to the shunt winding.

The invention will appear more clearly from the following detailed description when taken in connection with the accompanying drawings, showing by way of example a preferred embodiment of the inventive idea wherein like numerals refer to like parts throughout.

In the drawing, the figure is a wiring diagram of the generators and motors of a crane and circuits containing the same and illustrating one embodiment of the invention.

The system illustrated is for use with a crane having a truck adapted to travel in a back and forth direction, a boom mounted thereon adapted to swing about a vertical axis, and a cable carried by said boom and adapted to be hoisted or lowered. Each of these elements is operated by one or more electric motors energized by separate electric generators constructed in accordance with the instant invention.

The circuit for swinging the boom is designed by the reference character S, the circuit for hoisting the cable by the reference character H, and the circuit for causing travel of the truck by the reference character T. As far as the invention goes, the circuits are the same and only the circuit for the swing of the boom will be described in detail, though the structure and arrangement of parts will be alike for all units. To prevent confusion, the same reference numerals will be used for the different parts followed by the letter of the circuit with which it is associated.

Where a high degree of speed control is desired, direct current electric motors are desirable, and, in the circuit S, a shunt wound motor 10S has been shown. This motor has an armature 11S, brushes 12S and 13S and a shunt winding 14S.

For driving the motor 10S, a compound wound generator 20S is employed. This generator has an armature 21S, brushes 22S and 23S, a series field winding 24S, and a shunt field winding 25S. The winding 25S is tapped at its center, as indicated at 26S, to form a first section 27S and a second section 28S. Where several coils are used in the shunt winding, the tap is taken at the middle of the winding and between the adjacent coils. The two sections 27S and 28S are wound and arranged so that when current flows in the same direction in both sections, the flux produced by each section is also in the same direction. The series field winding 24S of generator 20S is differentially wound with respect to the shunt winding 25S whereby the flux produced by the same opposes the flux produced by the shunt winding 25S.

The series field winding 24S is connected at one end by means of a conductor 31S to the brush 23S. The other end of the said series field winding is connected by means of a conductor 32S to the brush 13S of motor 10S. Brush 22S of generator 20S is connected by a conductor 33S to the brush 12S of motor 10S. The free end of the shunt field winding section 28S is connected by means of a conductor 34S to the conductor 32S. The free end of the section 27S of the shunt field winding 25S is directly connected to a variable resistor 35S. This resistor has a movable contact 36S, which is connected by means of a conductor 37S to the conductor 33S and, thus, to the brush 22S of the generator.

In conjunction with the generator 20S a separate source of field current for the section 28S of the shunt field winding 28S is employed. This consists of an auxiliary generator 40 having an armature 41, brushes 42 and 43, a shunt field winding 44, and a variable resistor 45 connected in series with the shunt winding 44. Connected to the brushes 42 and 43 of the said generator is a feed line 46 having two conductors 47 and 48. These conductors are connected to the brushes 42 and 43. The field winding 44 has connected to it a conductor 51, which in turn is connected to the conductor 48. The field winding 44 is further connected by a conductor 52 to one end of the resistor 45. The movable contact 53 of said resistor is connected by means of conductor 54 to the conductor 47 and, thus, to the brush 42.

The shunt winding 14S of motor 10S is connected by means of conductors 15S and 16S to the conductors 47 and 48 of the line 46.

The section 28S of shunt winding 25S is energized from the current produced by the auxiliary generator 40. For varying the voltage across the section 28S, a combined control and reversing device indicated by the reference numeral 60S is employed. This device consists of two rotary variable resistors 61S and 62S. Each of these resistors has a rotating contactor 63S which are connected together and simultaneously rotated by means of a common shaft 64S. The contactor 63S of resistor 61S is connected by means of a conductor 65S to the tap 26S of the shunt winding 25S. The contactor 63S of resistor 62S is connected by means of a conductor 66S to a variable resistor 67S. This resistor in turn is connected by a conductor 68S to the conductor 34S and, thus, to the free end of the section 28S of shunt winding 25S. One end 71S of the resistor 61S is connected by means of a conductor 72S to the conductor 47 of line 46. The corresponding end 73S of resistor 62S is connected by means of a conductor 74S to the conductor 48 of the line 46. The other end 75S of resistor 61S is connected by means of a conductor 76S to the conductor 74S and, thus, to the end 73S of resistor 62S. In a similar manner the other end 77S of resistor 62S is connected by means of a conductor 78S to the conductor 72S and, thus, to the end 71S of the resistor 61S.

The circuit H for hoisting and lowering the cable uses, in addition to the parts employed in circuit S, a brake mechanism which utilizes a shunt field winding 81H for the motor 10H and which is energized by generator 20H to produce flux opposing the flux produced by winding 14H. The conductor 32H is directly connected to the winding 81H and also to one end of a variable resistor 82H. This resistor is, in turn, connected to a switch 83H, which in turn is connected to the conductor 34H. A conductor 84H connects the conductor 34H with the series winding 24H, which winding is further connected to the winding 81H by means of a conductor 85H. When the motor is running and braking is required, the switch 83H is closed and winding 81H energized, which opposes the flux produced by winding 14H and brakes the running out of the cable. A switch 86H in the circuit for the field winding 14H is opened at the time the switch 83H is closed.

In the T circuit, two motors 11T and 11TA are employed, which may be coupled to separate wheel axles, where several are employed, to give greater traction where needed.

The operation of the invention is as follows: For the sake of simplifying the explanation, it will be assumed that the generator 20S is a 200 volt generator having a 200 volt shunt field split to provide two 100 volt shunt field sections. It will also be assumed that the voltage of the generator 40 will be 100 volts. An examination of the drawing will reveal that the voltage across the shunt field section 28S will be 300 volts, being the sum of the voltage of the generator 20S and the auxiliary generator 40. Since the field section 27S is a 100 volt winding, the voltage across the shunt field winding must be dropped so that the voltage across the same at full output will be 200 volts. This is accomplished by means of the resistor 35S which is adjusted to procure the desired voltage. While resistor 35S is shown adjacent to field section 27S, the same may be placed at any position in the shunt field circuit between conductors 37S and 34S.

Consider now that a short occurs between the conductors 33S and 32S with full excitation of the generator. Flux in one direction will be produced by section 28S of shunt winding 25S due to the fact that this section is separately excited and a weak flux in the opposite direction will be produced by the series winding 24S. As the current in winding 24S increases, the flux in section 27S of shunt field winding 25S will oppose the flux in section 28S of said shunt field winding. When the current reaches 200% of full load current, the flux produced by series winding 24S will cancel the flux produced by section 28S of the shunt field winding. Thus, the generator is limited to 200% full load current. Now, by adjusting the voltage across section 28S by means of resistor 67S, other current limits can be procured.

In the event that the generator is operating at full load and the shunt field winding circuit of the generator opened there would be no current in section 27S of the shunt winding 25S. So, by adjusting 35S, a suitable maximum voltage can be arrived at.

With full field voltages, the removal of the external field supply will reduce the voltage across conductors 33S and 32S to 200 volts and the voltage across section 27S of the shunt field winding 25S to 60 volts. This will only produce 30% full load flux, which is insufficient to sustain the full load output of the generator and the generator voltage will decay very rapidly.

Assume now full generator voltage of one polarity and full reverse auxiliary voltage of opposite polarity to change the direction of rotation of the motor 10S. This would reverse the direction of the flux in section 25S. But the reversed flux in this section would now be in the same direction as the flux in the series winding 24S, which would now be additive and assist in making the changeover.

It can, hence, be seen that by changing the resistance of resistor 35S, the maximum torque can be adjusted, and, by adjusting the resistor 67S, the maximum speed may be set.

The advantages of the invention are manifest. The cost of manufacture of applicant's generator is only slightly greater than the cost of the usual generator system. The circuit fully protects the generator and motor from abnormal torque and voltage. It has been found that even with plugging and fast reversing, the response is immediate and that no injury occurs.

The invention is not to be understood as restricted to the details set forth since these may be modified within the scope of the appended claims without departing from the spirit and scope of the invention.

Having thus described the invention what is claimed as new and desired to be secured by Letters Patent is:

1. In a compound wound, direct current, electric generator for energizing a variable electric load, said generator having a rotatable armature comprising a core, windings on said core, a commutator connected to said windings, and brushes contacting said commutator, the combination of:
   (a) a split shunt field winding having,
   (b) a first section,
   (c) a second section,
   (d) said sections being connected in series and at full load producing flux in the same directions,
   (e) means for exciting said first section from the output of said generator,
   (f) means for separately exciting the second section from a separate source of voltage,
   (g) a series field winding energized by said generator and connected in series with the armature windings and load,
   (h) said series field winding producing flux opposing the flux produced by said second field winding and,
   (i) means for varying the voltage across said shunt field winding.
2. The combination according to claim 1 in which:
   (a) the means for varying the voltage across the shunt field winding comprises a variable resistor in series with said shunt field winding.
3. The combination according to claim 1 in which:
   (a) the first section and second section of the shunt field winding are substantially equal.
4. The combination according to claim 1 in which:
   (a) the field flux at full load of the generator is produced approximately,
   (b) 20% by the series field winding,
   (c) 40% by the first section of the shunt field winding and,
   (d) 40% by the second section of the shunt field winding.
5. The combination according to claim 2 in which:
   (a) the voltage across the two sections of the shunt winding is substantially equal to the sum of the output voltage of the generator and the voltage of the means for separately exciting the second section and,
   (b) the resistance of the resistor is sufficient to reduce the voltage across the shunt field winding to substantially the voltage of the generator.

References Cited

UNITED STATES PATENTS

| 2,342,845 | 2/1944 | Cowin | 322—63 X |
| 2,379,837 | 7/1945 | Stahmer | 322—63 |

FOREIGN PATENTS

| 886,769 | 10/1943 | France. |
| 650,908 | 3/1951 | Great Britain. |

BENJAMIN DOBECK, *Primary Examiner.*

H. HUBERFELD, *Assistant Examiner.*

U.S. Cl. X.R.

310—188, 189; 322—64, 80, 87